(12) United States Patent
Haustcin et al.

(10) Patent No.: US 7,697,404 B2
(45) Date of Patent: Apr. 13, 2010

(54) MEDIUM, SYSTEM, AND METHOD FOR A COMMON OPTICAL DATA STORAGE MEDIUM DEPRESSION DEPTH

(75) Inventors: Nils Haustcin, Zornheim (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/248,392

(22) Filed: Oct. 12, 2005

(65) Prior Publication Data
US 2007/0081447 A1    Apr. 12, 2007

(51) Int. Cl.
*G11B 7/24* (2006.01)
(52) U.S. Cl. .................................................. 369/275.1
(58) Field of Classification Search ........................ None
See application file for complete search history.

(56) References Cited

U.S. PATENT DOCUMENTS

| | | | |
|---|---|---|---|
| 4,161,752 A | 7/1979 | Basilico ...................... | 369/93 |
| 5,470,627 A | 11/1995 | Lee et al. .................... | 428/64.4 |
| 5,666,344 A * | 9/1997 | Imaino et al. ................. | 369/94 |
| 5,702,792 A | 12/1997 | Iida et al. | |
| 5,724,339 A | 3/1998 | Ogawa ...................... | 369/275.4 |
| 5,764,619 A | 6/1998 | Nishiuchi et al. | |
| 6,038,208 A | 3/2000 | Shikunami et al. ........... | 369/275.3 |
| 6,565,974 B1 * | 5/2003 | Uchiyama et al. ........... | 428/412 |
| 6,707,785 B1 | 3/2004 | Kato ......................... | 369/275.3 |

(Continued)

FOREIGN PATENT DOCUMENTS

EP             08743856 B1      10/1998

(Continued)

OTHER PUBLICATIONS

"Experimental Results of 3-Piece 0.4 mm Molded Substrate," Myong-Do Ro et al. Japanese Journal of Applied Physics, Part 1 vol. 40, No. 3B Mar. 2001.

(Continued)

*Primary Examiner*—Joseph H Feild
*Assistant Examiner*—Henok G Heyi
(74) *Attorney, Agent, or Firm*—Kunzler & McKenzie (57) ABSTRACT

A medium, system, and method are disclosed for a common data storage medium depression depth. An optical data storage medium comprises a plurality of spacer layers and data surfaces. A wavelength for a radiation beam such as the emission of a laser diode is identified. The index of refraction for a first spacer layer or substrate is also identified. The substrate is configured to transmit the radiation beam. The index of refraction of a second spacer layer that is configured to transmit the radiation beam is also identified. A depression depth for a plurality of pits for ROM media, or sector headers for recordable media, or grooves for recordable media on each data surface is substantially equal to the radiation beam wavelength divided by four times the average of the indexes of refraction of each spacer layer. In one embodiment, the average is an arithmetic mean of the indexes of refraction. In an alternate embodiment, the average is a harmonic mean of the indexes of refraction. The average may also be a geometric mean of indexes of refraction.

30 Claims, 10 Drawing Sheets

U.S. PATENT DOCUMENTS

| | | | |
|---|---|---|---|
| 7,539,121 B2* | 5/2009 | Tomiyama et al. | 369/275.4 |
| 2002/0118565 A1* | 8/2002 | Matsuo | 365/94 |
| 2003/0053407 A1 | 3/2003 | Hirokane et al. | 369/275.4 |
| 2004/0037184 A1 | 2/2004 | Moriya et al. | 369/47.24 |
| 2004/0076110 A1 | 4/2004 | Hino et al. | 369/275.3 |
| 2004/0080938 A1 | 4/2004 | Holman et al. | 362/231 |
| 2004/0202096 A1* | 10/2004 | Nakajima et al. | 369/275.4 |
| 2004/0223445 A1 | 11/2004 | Nishiuchi et al. | 369/120 |
| 2004/0241575 A1 | 12/2004 | Ootera | |
| 2005/0092913 A1* | 5/2005 | Ishihara | 250/287 |

FOREIGN PATENT DOCUMENTS

| | | |
|---|---|---|
| JP | 8-212597 | 8/1996 |
| JP | 09-035333 | 2/1997 |
| JP | 10-302381 | 11/1998 |
| JP | 2003-233930 | 8/2003 |
| JP | 2003-303424 | 10/2003 |
| JP | 2004-028603 * | 4/2004 |
| JP | 2005-243240 | 9/2005 |
| WO | 96/31875 | 10/1996 |

OTHER PUBLICATIONS 120 mm DVD-Read-Only Disk, Standard EMCA-267, 3rd Edition, Apr. 2001, http://www.ecma.ch.

* cited by examiner

MEDIUM, SYSTEM, AND METHOD FOR A COMMON OPTICAL DATA STORAGE MEDIUM DEPRESSION DEPTH

BACKGROUND OF THE INVENTION

1. Field of the Invention

This invention relates to optical media and more particularly relates to the depression depth made in optical media.

2. Description of the Related Art

Figure 1:
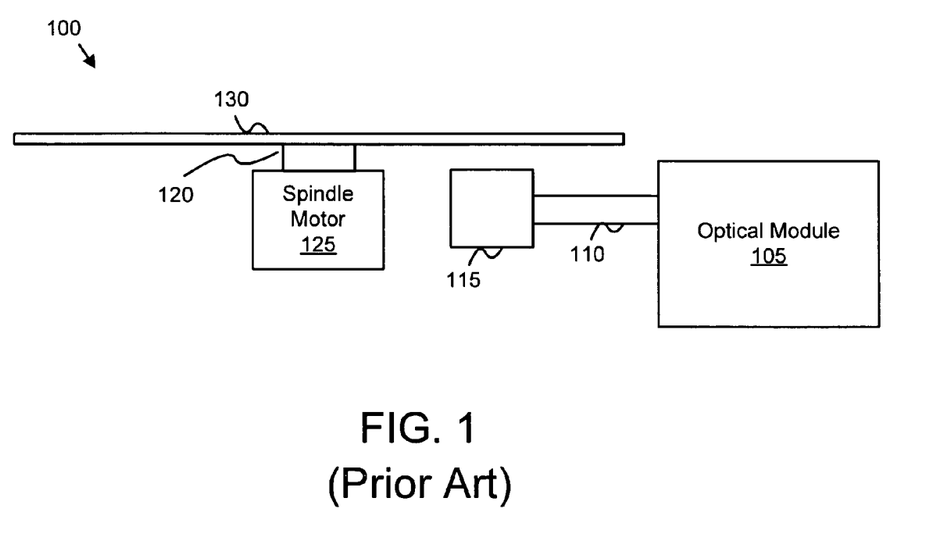
FIG. 1 is a schematic block drawing illustrating one embodiment of an optical data storage drive.

An optical data storage medium such as a compact disc ("CD"), digital versatile disc ("DVD"), DVD read only memory ("DVD-ROM"), High Definition DVD-ROM ("HD-DVD-ROM"), writable DVD and HD-DVD media, Blu-Ray ROM, Blu-Ray writable media, and the like, stores digital data that is retrieved using a radiation beam such as the emission of a laser diode. FIG. 1 is a schematic diagram illustrating one embodiment of an optical data storage device 100 for the optical data storage medium 130. The device 100 includes an optical module 105, an arm 110, an optical head 115, a clamping spindle 120, a spindle motor 125, and the optical data storage medium 130.

The optical data storage medium 130 (herein referred to as "Disc") is removably mounted on the clamping spindle 120. The spindle motor 125 rotates the Disc 130. The arm 110 positions the optical head 115 to retrieve data from the Disc 130. In one embodiment, the optical module 105 includes a voice coil motor that transports the arm 110 and the optical head 115 radially relative to the Disc 130. The combination of the rotation of the Disc 130 by the spindle motor 125 and radial movement of the optical head 115 may position the optical head 115 over any portion of the Disc 130 that is used for data storage.

Figure 2:
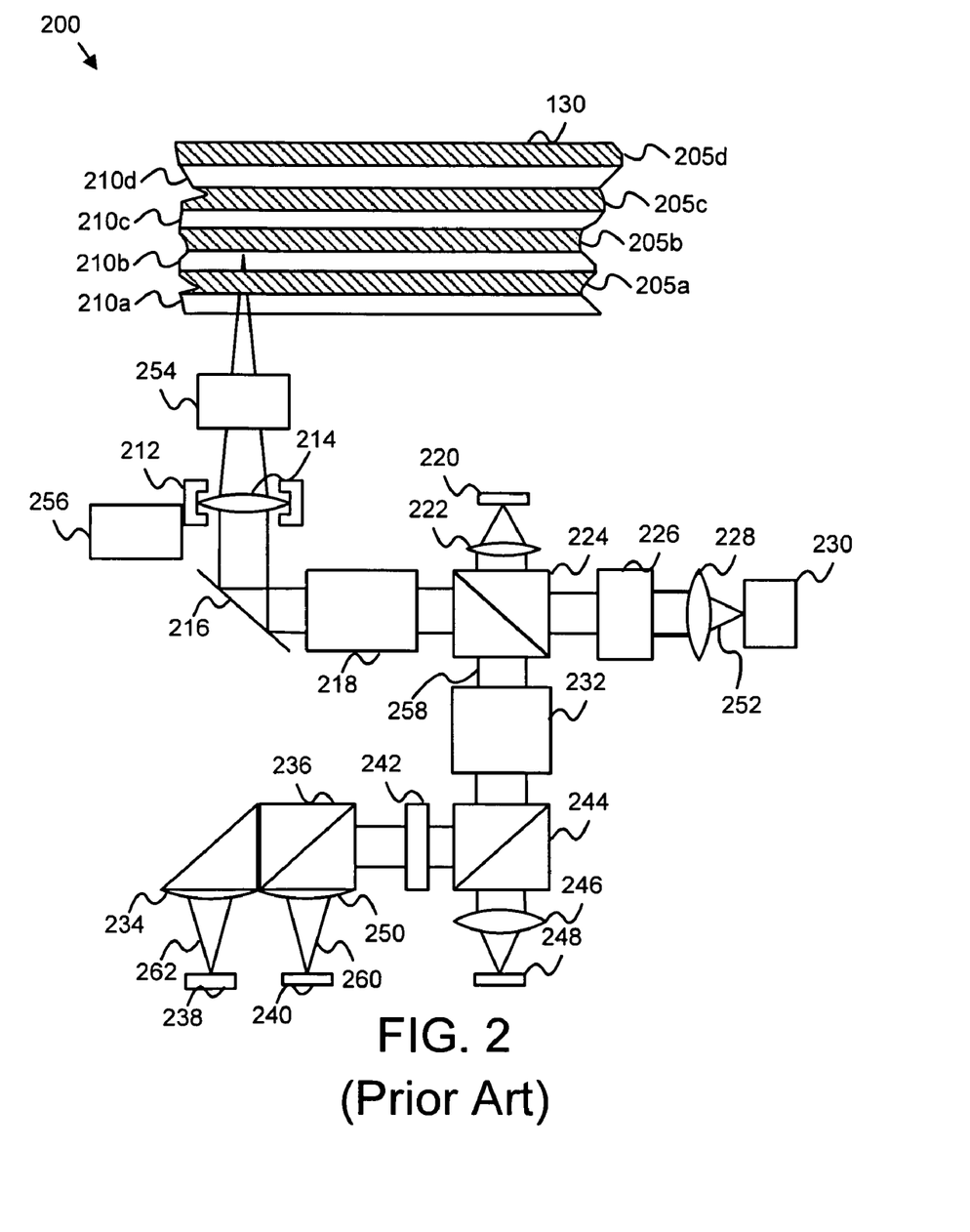
FIG. 2 is a schematic block diagram illustrating one embodiment of an optical path of an optical data storage drive.

FIG. 2 is a schematic diagram illustrating one embodiment of an optical path 200 of the optical data storage device 100 of FIG. 1. The optical head 115, arm 110, and optical module 105 of FIG. 1 may comprise optical path 200. The optics path 200 includes a holder 212, one or more lens 214, 222, 228, 234, 250, a mirror 216, an arm path 218, one or more optical detectors 220, 238, 240, a first beam splitter 224, a circularizer 226, a laser diode 230, a multiple data surface filter 232, a second beam splitter 244, a half-wave plate 242, a polarizing beam splitter 236, an astigmatic lens 246, a focus actuator motor 256, and a quad optical detector 248. Also depicted is the Disc 130 of FIG. 1 with a plurality of data surfaces 205 and a plurality of spacer layers 210.

The laser diode 230 may be a gallium-aluminum-arsenide diode laser that produces a primary radiation beam 252. In one embodiment the radiation beam 252 is in the range of 630 nm to 670 nm. In an alternate embodiment, the radiation beam 252 is in the range of 385 nm to 425 nm. The radiation beam 252 is collimated by the third lens 228 and is circularized by the circularizer 226 which may be a circularizing prism. The radiation beam 252 passes to the first beam splitter 224. A portion of the beam 252 is reflected by the first beam splitter 224 to the second lens 222 and the first optical detector 220. The first optical detector 220 monitors the power of radiation beam 252.

The rest of radiation beam 252 passes through the arm path 218 to the mirror 216. The arm path 218 may be a variable length optical path between the first beam splitter 224 that resides in the optical module 105 of FIG. 1 and the mirror 216 that may reside in the optical head 115 of FIG. 1. The beam 252 is reflected by the mirror 216 and passes through the first lens 214 and the multiple data surface aberration compensator 250 and is focused onto one of the data surfaces 205 of the Disc 130. As depicted, the radiation beam 252 is focused on the second data surface 205b.

The first lens 214 is mounted in the holder 212. The position of holder 212 is adjusted relative to medium 12 by the focus actuator motor 256 which may be a voice coil motor. The focus actuator motor 256 may position the first lens 214 relative to the Disc 130 to focus the beam 252 on any one of the data surfaces 205.

A portion of the radiation beam 252 may be reflected at the data surface 205 as a reflected beam 258. The reflected beam 258 returns through the compensator 254 and the first lens 214 and is reflected by the mirror 216. At the first beam splitter 224, the reflected beam 258 is reflected through the multiple data surface filter 232. The reflected beam 258 passes through the multiple data surface filter 222 and passes to the second beam splitter 244.

At the second beam splitter 244 a first portion of the reflected beam 258 is directed to the astigmatic lens 246 and the quad optical detector 248. The quad optical detector 248 is divided into four equal sections. The quad optical detector 248 detects and provides focus and tracking information in response to the reflected beam 258. When the radiation beam 252 is focused on the data surface 205, the reflected beam 258 is focused on the quad optical detector 248 with a circular cross section with each of the sections of the quad optical detector 248 receiving substantially equal radiation.

If the radiation beam 252 is not focused on the data surface 205, the reflected beam 258 is focus on the quad optical detector 248 with an oval cross section. As a result, one or more quad optical detector 248 sections receive more radiation than other sections. The focus error of the radiation beam 252 is estimated from differences in radiation received by the sections, and the optical module 105 may correct the focus. For example, the focus actuator motor 256 may position the holder 212 and the first lens 214 to focus the radiation beam 252 in response to reflected beam 258 radiation pattern on the quad optical detector 248.

A second portion of the reflected beam 258 is directed from the second beam splitter 244 through the half-wave plate 242 to the polarizing beam splitter 236. The polarizing beam splitter 236 separates the reflected beam 258 into a first orthogonal polarized light component 260 and a second orthogonal polarized light component 262. The fifth lens 250 focuses the first orthogonal polarized light component 260 on the third optical detector 240 while the fourth lens 250 focuses the second orthogonal polarized light component 262 on the second optical detector 238. The second and third optical detectors 238, 240 detect the reflected beam 258 or absences of the reflected beam 258, (both referred to herein as "Detections"). The second and third optical detectors 238, 240 further provide detection signals in response to the Detections of the reflected beam 248.

Figure 3:
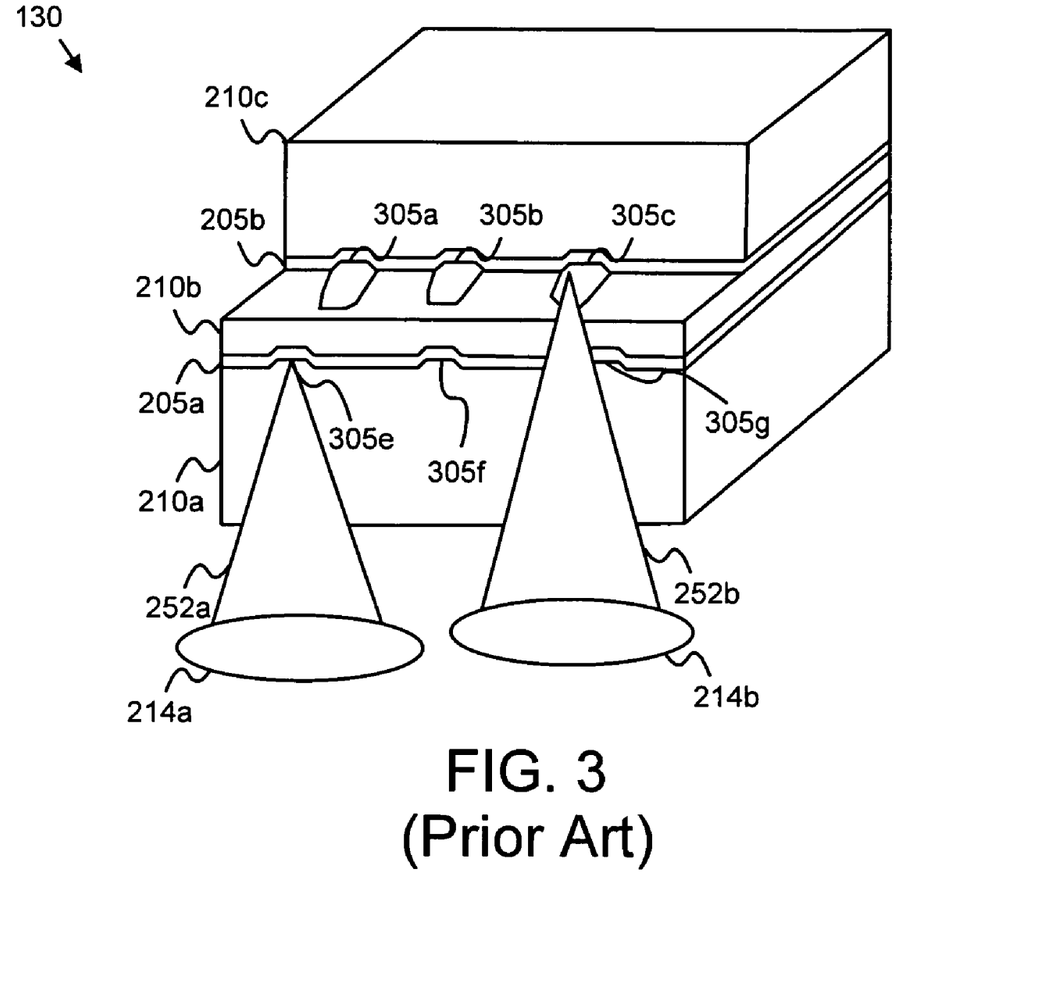
FIG. 3 is a cross-section drawing of a portion of an optical data storage medium showing pits in the data surface.

FIG. 3 is a cut-away perspective drawing illustrating one embodiment of a portion of the DISC 130 of FIGS. 1 and 2. As depicted, the Disc 130 may be a dual-layer DVD-ROM media. In addition to DVD-ROM media, the Disc 130 could be HD-DVD-ROM media, or Blu-Ray ROM media. Alternately, FIG. 3 may depict the stamped headers of recordable data sectors in recordable optical media.

The Disc 130 includes one or more spacer layers 210 and one or more data surfaces 205. For illustrative purposes, the thickness of the data surfaces 205 and spacer layers 210 are not drawn to scale. In one embodiment, a spacer layer 210 such as the first spacer layer 210a may also be referred to as the substrate. Each spacer layer 210 is configured to transmit a radiation beam 252 such as the radiation beam 252 of FIG.

2. In addition, each spacer layer 210 has an index of refraction that is a physical property of the spacer layers 210.

The first data surface 205a may be coated with a semi-transparent/semi-reflective coating, such as gold. The radiation beam 252 may either be reflected off of the first data surface 205a or transmit through the first data surface 205a to the second data surface 205b. The second data surface 205b is typically highly reflective and coated with aluminum or another highly reflective coating. In one embodiment, for Discs 130 with three or more data surfaces 205, all data surfaces 205 are semi-transparent/semi-reflective except for the inner data surface 205 which is reflective.

A lens 214 such as the first lens 214 of FIG. 2 focuses a radiation beam 252 such as the radiation beam 252 of FIG. 2 on either the outer first data surface 205a or the inner second data surface 205b. For purposes of illustration, a first and second instance of the first lens 214a, 214b is depicted focusing a first and second radiation beam 252a, 252b on the first and second data surface 205a, 205b. However, a single radiation beam 252 is typically employed.

The first data surface 205a is physically separated from the second data surface 205b by a second spacer layer 210b. Each data surface 205 is depicted with one or more pits 305. The pits 305 are of a specified depth to cause light cancellation so that the pits look dark to the optical path 200. In one embodiment, the pits 305 are stamped into the data surface 205. The stamped data surface 205 may be physically connected to the spacer layer 210. A plurality of data surfaces 205 and spacer layers 210 may be physically connected to form the Disc 130.

In a certain embodiment, the pits 305 are stamped into a groove or an inverted groove of the data surface 205. Recordable media typically has such stamped grooves, and adjacent lands there between, where data is recorded by the user. Sector headers, marking the fixed block architecture of the recordable media, may be encoded with pits within the grooves and on the lands, as sector headers are intended to be read-only. The groove or inverted groove may be formed on the data surface 205 to aid in tracking and correction the focus of the radiation beam 252.

The first radiation beam 252a is focused on a fifth pit 305a of the first data surface 205a. The second radiation beam 252b is focused on a third pit 305c of the second data surface 205b. The depth of a pit 305 is selected such that when the radiation beam 252 is focused on the base of the pit 305, as is depicted for the third and fifth pits 305c, 305e, the radiation beam is reflected from the pit 305 with a phase that is substantially one hundred and eighty degrees out of phase from the radiation beam 252 entering the pit 305. The interference of the reflected beam 258 and the radiation beam 252 is detected by the second and third optical detector 238, 240, detecting the pit 305.

The depth d of the pit 305 has been determined as a function of the wavelength λ of the radiation beam 252 and the index of refraction n of the spacer layer 210, as illustrated in Equation 1.

$$d = \frac{\lambda}{4n} \qquad \text{Equation 1}$$

Because each spacer layer 210 may have a unique index of refraction, each data surface 205 may have a different pit 305 depth. For example, Equation 2 illustrates the relationship between the pit depth $d_1$ for the first data surface 205a and the index of refraction $n_1$ of the first spacer layer or substrate 210a, the pit depth $d_2$ for the second data surface 205b and the index of refraction $n_2$ of the second data surface $n_1$, and the radiation beam 252 wavelength λ.

$$d_1 n_1 = d_2 n_2 = \frac{\lambda}{4} \qquad \text{Equation 2}$$

Unfortunately, providing for a unique pit depth for each data surface 205 increases the complexity of manufacturing the Discs 130 as multiple pit depths must be stamped. The increased complexity increases the cost of manufacturing Discs 130.

From the foregoing discussion, it should be apparent that a need exists for an apparatus, system, and method that calculate a common Disc 130 pit depth. Beneficially, such an apparatus, system, and method would reduce the manufacturing costs of Discs 130 by allowing each ROM data surface 205 to be stamped with pits 305 of a common pit depth, or each rewritable surface to be stamped with grooves of a common groove depth.

SUMMARY OF THE INVENTION

The present invention has been developed in response to the present state of the art, and in particular, in response to the problems and needs in the art that have not yet been fully solved by currently available methods of determining optical data storage medium pit depths. Accordingly, the present invention has been developed to provide a medium, system, and method for a common optical data storage medium ("Disc") pit depth that overcome many or all of the above-discussed shortcomings in the art.

A medium of the present invention is presented with a common pit depth. The medium includes one or more data surfaces, and one or more spacer layers. In one embodiment, a first spacer layer is referred to as a substrate. The substrate is configured to transmit a radiation beam with a first index of refraction. A first data surface of the plurality of data surfaces includes a land portion with a plurality of pits disposed on the land portion. Each pit has a specified pit depth. The pit depth is the perpendicular distance between the plane of the land portion and the base of the pit. The pits or the absence of pits encode digital data. In one embodiment, the pits encode read only data. In an alternate embodiment, the pits encode headers for recordable Discs.

A second data surface is also configured with a plurality of pits of the specified pit depth disposed on a land surface. A second spacer layer maintains a spacing distance between the first and second data surfaces. In addition, the second spacer layer is configured to transmit the radiation beam with a second index of refraction. The specified pit depth is substantially equal to the radiation beam wavelength divided by four times the average of the first and second indexes of refraction. The medium reduces manufacturing costs by allowing the stamping of all pits to a common pit depth.

A system of the present invention is presented for a common Disc pit depth. The system may be embodied in a high capacity optical data storage system such as a DVD, HD-DVD, or Blue-Ray systems. In one embodiment, the system includes a Disc, a spindle motor, an optical head, an arm, an optical module, and a control module.

The Disc encodes digital data on a plurality of data surfaces. Each data surface encodes the data using a plurality of pits. The control module directs the spindle motor to rotate the Disc. In addition, the control module directs the arm to position the optical head over a specified portion of the Disc. The optical module generates a radiation beam with a specified wavelength. The optical head directs the radiation beam to the Disc, focusing the beam on one of the plurality of data surfaces. The optical head directs a reflected radiation beam or reflected beam from the data surface to optical module. The optical module detects pits and the absence of pits on the data surface. The control module retrieves the data encoded on the Disc from the detected pits and absences of pits.

The Disc includes a plurality of spacer layers. The each spacer layer is configured to transmit the radiation beam with an index of refraction. Each data surface may include a land portion with the pits encoding the data disposed on the land portion. Each pit has a specified pit depth. The specified pit depth is substantially equal to the radiation beam wavelength divided by four times the average of the indexes of refraction. The system retrieves data from a Disc with common pit depths. Employing common pit depths may reduce the manufacturing cost of the Disc.

A method of the present invention is presented for a calculating a common Disc depression depth. The method in the disclosed embodiments substantially includes the steps necessary to carry out the functions presented above with respect to the operation of the described medium and system. In one embodiment, the method includes identifying a radiation beam wavelength, identifying a plurality of indexes of refraction, calculating an average index of refraction, and calculating a depression depth.

An operator identifies a wavelength for a radiation beam such as a laser diode. The operator also identifies the indexes of refraction for each of a plurality of spacer layers. Each spacer layer is configured to transmit the radiation beam. In one embodiment, the first spacer layer is referred to as the substrate.

The operator calculates an average index of refraction for the plurality of indexes of refraction for the spacer layers. In one embodiment, the average is an arithmetic mean of the indexes of refraction. In an alternate embodiment, the average is a harmonic mean of the indexes of refraction. The average may also be a geometric mean of the indexes of refraction. In one embodiment, the operator selects materials for each of the spacer layers with substantially equivalent indexes of refraction.

The operator calculates a depression depth as substantially equal to the radiation beam wavelength divided by four times the average of the indexes of refraction. In one embodiment, the depression is a pit. In an alternate embodiment, the depression is a groove. The method calculates a common depression depth for all data surfaces of a Disc. The method may reduce manufacturing costs by allowing for common configurations for the dies used to stamp the data surfaces of the Disc.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or w more of the specific features or advantages of a particular embodiment. In other instances, additional features and advantages may be recognized in certain embodiments that may not be present in all embodiments of the invention.

The present invention calculates a common depression depth for pits encoding digital data disposed a plurality of data surfaces on a Disc. In addition, the present invention may reduce the manufacturing cost of the Disc by allowing the pits of all data surfaces to be stamped to a common pit depth. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 4:
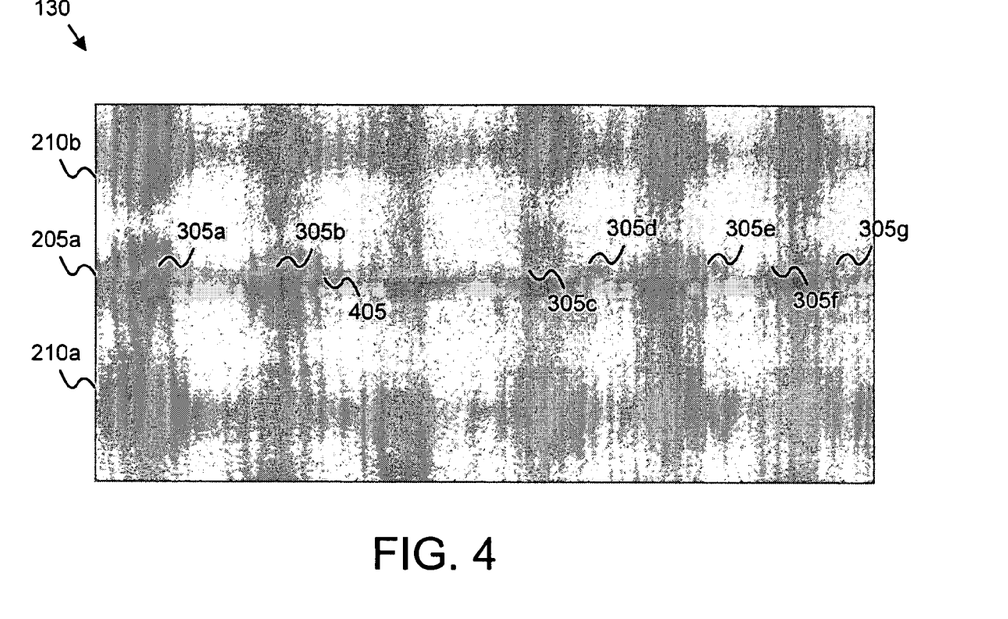
FIG. 4 shows an electron microscope image of a cross section of a portion of an optical data storage medium.

FIG. 4 shows an electron microscope image of a cross section of a portion of a Disc 130 such as the Disc 130 of FIGS. 1-3. The Disc 130 includes a first spacer layer or substrate 210a. The substrate 210a is configured to transmit the radiation beam with first index of refraction. The Disc 130 also includes a first data surface 205a. The first data surface 205a includes a land portion 405. Pits 305 such as the pits 305 of FIG. 3 encoding data are disposed on the land portion 405. Each pit 305 has a specified pit depth. The pit depth is the perpendicular distance between the plane of the land portion and the base of the pit.

Figure 5:
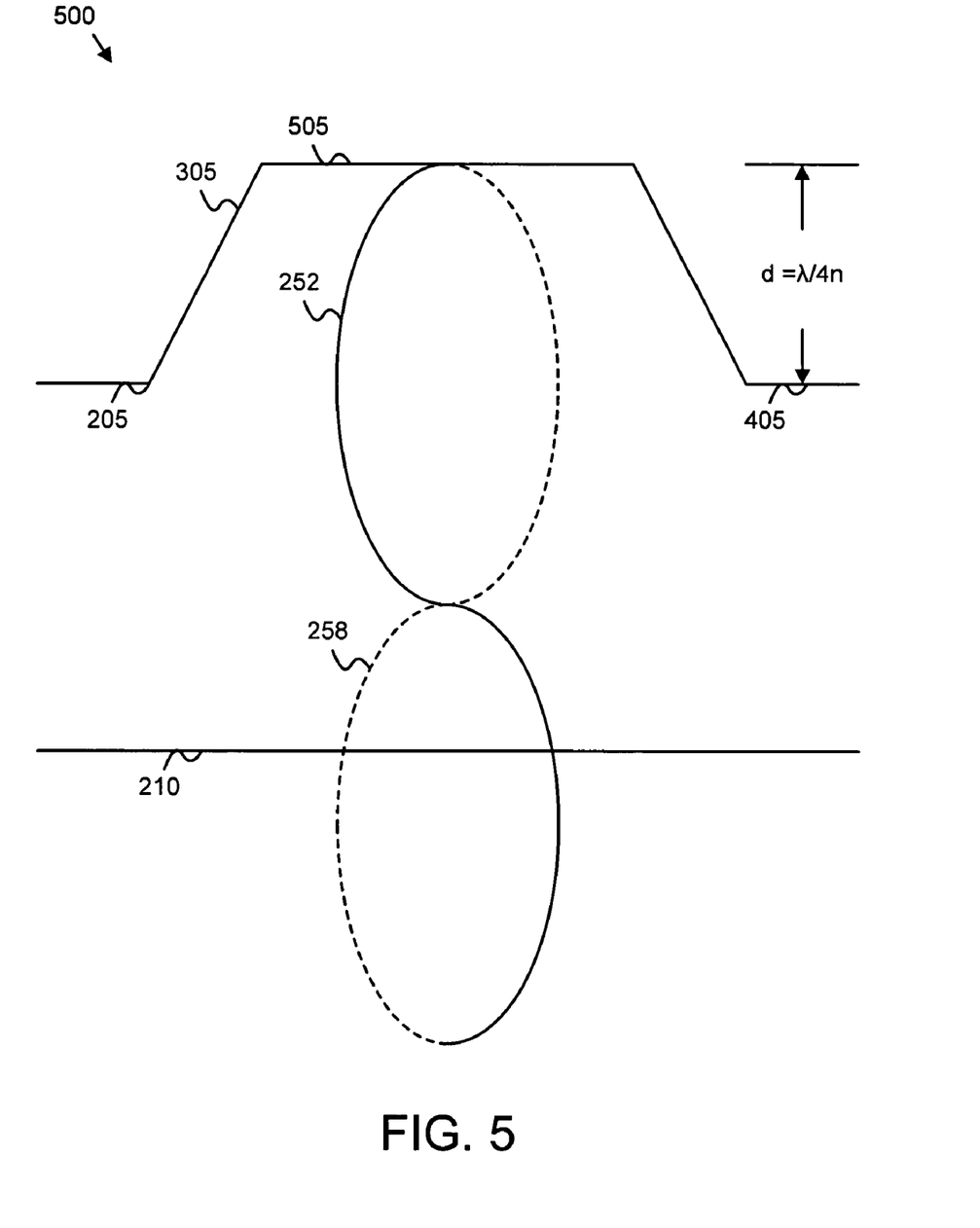
FIG. 5 is a schematic diagram illustrating one embodiment of light cancellation in accordance with the present invention.

FIG. 5 is a schematic diagram illustrating one embodiment of light cancellation 500 in accordance with the present invention. A radiation beam 252 such as the radiation beam 252 of FIGS. 2 and 3 is focused on the pit base 505 of a pit 305 such as the pit 305 of FIG. 3. The pit 305 is disposed on a data surface 205 of a Disc 130 such as the Disc 130 and data surface 205 of FIGS. 2 and 3. The pit 305 may be coated with a reflective coating such as aluminum if the pit is in an inner data surface 205 such as the second data surface 205b of FIG. 3. Alternatively, the pit 305 may be coated with a semi-transparent/semi-reflective coating such as gold, if the pit 305 is in an outer data surface 205 such as the first data surface 205a of FIG. 3.

While traversing the pit 305 from the plane of a land portion 405 of the pit 305 to the pit base 505, the radiation beam 252 passes through a spacer layer 210 such as the spacer layer 210 of FIGS. 2 and 3. For illustrative purposes, the thicknesses of the data surface 205 and the spacer layer 210 are not drawn to scale. The spacer layer has an index of refraction n. A pit depth d from the plane of the land portion 405 to the pit base 505 is calculated by Equation 1 where λ is the wavelength of the radiation beam 252 and n is the index of refraction of the spacer layer 210.

Therefore the pit depth d is equal to one quarter of a wavelength of the radiation beam 252. The radiation beam 252 is reflected from the pit base 505 as a reflected beam 258 such as the reflected beam 258 of FIG. 2. The radiation beam 252 and the reflected beam 258 have substantially opposite phases. This causes light cancellation to occur, as the reflected beam 258 out of the pit 305 is approximately 180 degrees out of phase with the radiation beam 252. The superposition of the radiation beam 252 and the reflected beam 258 produces darkness, which is detected by optical detectors 238, 240 such as the second and third optical detectors 238, 240 of FIG. 2.

Figure 6:
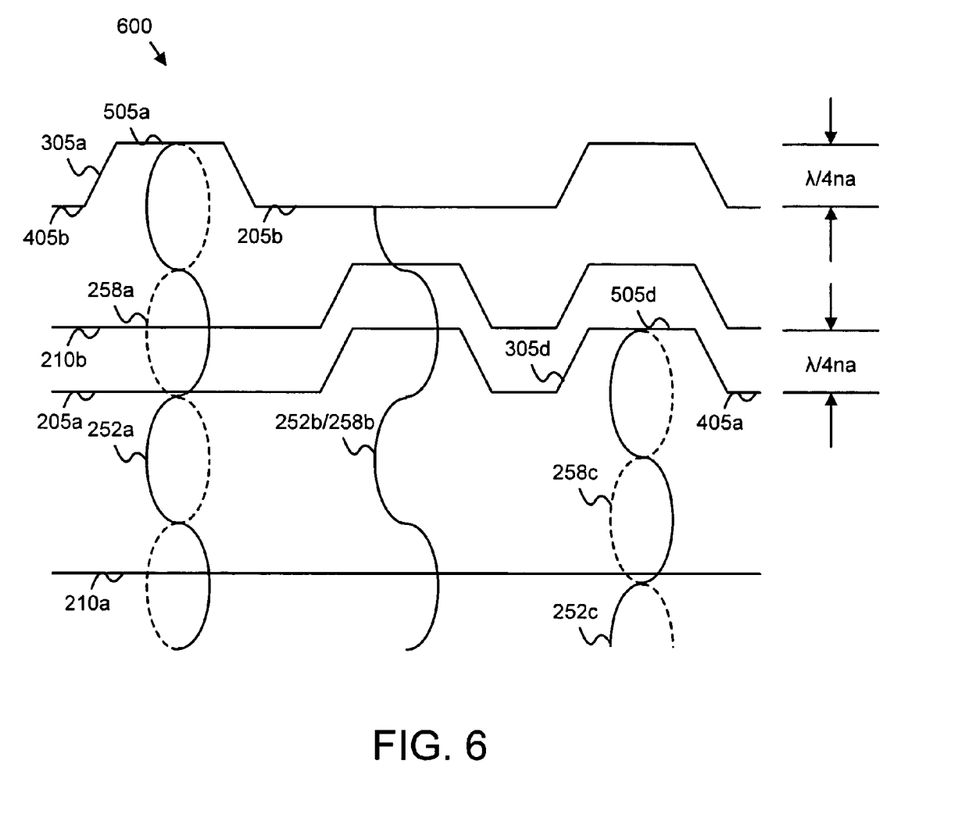
FIG. 6 is a schematic diagram illustrating one embodiment of common pit depth light cancellation of the present invention.

FIG. 6 is a schematic diagram illustrating one embodiment of common pit depth light cancellation 600 of the present invention. A first and second data surface 205a, 205b, a first spacer layer or substrate 210a, and a second spacer layer 210b are depicted that may be the first and second data surfaces 205 and the first and second spacer layers 210 of FIGS. 2 and 3. In one embodiment, the material of the substrate 210a and the second spacer layer 210b are selected such that the index of refraction of both the substrate 210a and the second spacer layer 210b are substantially equivalent.

A first radiation beam 252a passes through the substrate 210a and the first data surface 205a and is reflected as a first reflected beam 258a from a first pit base 505a of a first pit 305a such as the pits 305 of FIGS. 3-5. The pit depth d of the each pit 305 disposed on the first and second data surface 205a, 205b is calculated by Equation 3, where λ is the wavelength of the radiation beam 252 and na is the average index of refraction of the substrate 210a and the second spacer layer 210b.

$$d = \frac{\lambda}{4na} \quad \text{Equation 3}$$

The first reflected beam 258a is substantially out of phase with the first radiation beam 252a, such that the first reflected beam 258 is substantially canceled and thus detected as "dark" by detectors 238, 240.

A second radiation beam 252b passes through the substrate 210a and the first data surface 205a and pit 505b and is reflected as a second reflected beam 258b from a second land portion 405b of the second data surface 205b. The second reflected beam 258b is substantially in phase with the second radiation beam 252b. Therefore the second reflected beam 258b is not substantially canceled and is detected as "light" by detectors 238, 240.

A third radiation beam 252c passes through the substrate 210a and is reflected from a fourth pit base 505d of a fourth pit 305d of the first data surface 205a. The pit depth of the fourth pit 305d from a first land portion 405a to the fourth pit base 505d is also d, the common pit depth for each data surface 205. The third reflected beam 258c is substantially out of phase with the third radiation beam 252c. Therefore the third reflected beam 258c is substantially canceled by the interference of the first radiation beam 252c and is detected as "dark" by detectors 238, 240.

Figure 7:
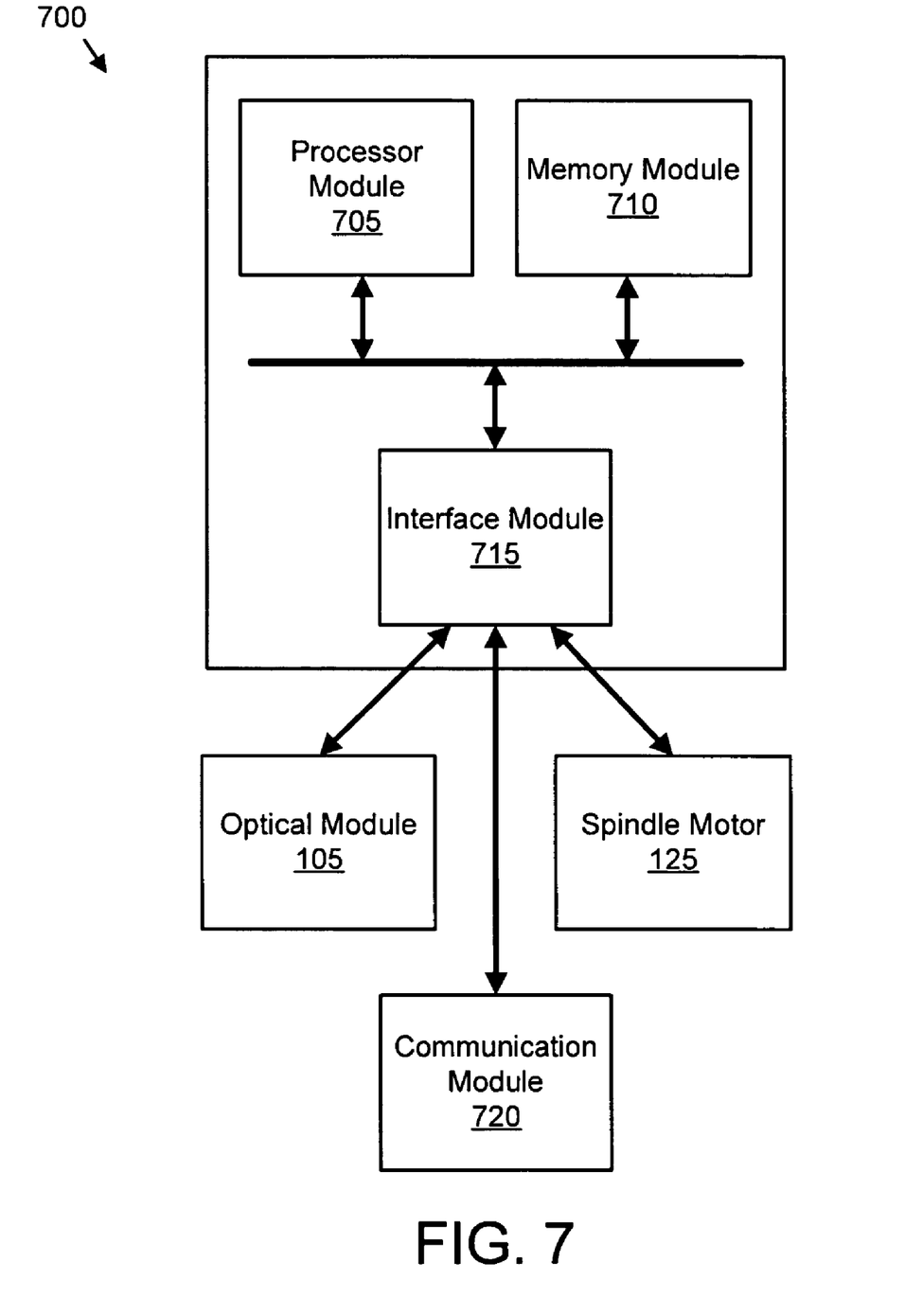
FIG. 7 is a schematic block diagram illustrating one embodiment of a control module of the present invention.

FIG. 7 is a schematic block diagram illustrating one embodiment of a control module 700 of the present invention.

The module 700 includes a processor module 705, a memory module 710, and an interface module 715.

The processor module 705, memory module 710, and interface module 715, may be fabricated of semiconductor gates on one or more semiconductor substrates. Each semiconductor substrate may be packaged in one or more semiconductor devices mounted on circuit cards. Connections between the processor module 705, the memory module 710, and the interface module 715 may be through semiconductor metal layers, substrate to substrate wiring, or circuit card traces or wires connecting the semiconductor devices.

The memory module 710 stores software instructions and data. The processor module 705 executes the software instructions and manipulates the data as is well know to those skilled in the art. The processor module 705 communicates with a spindle motor 125 and an optical module 105 such as the spindle motor 125 and optical module 105 of FIG. 1 through the interface module 715. The processor module 705 may direct the spindle motor 125 to rotate a Disc 130 such as the Disc 130 of FIGS. 1 and 2. In addition, the processor module may direct the optical module 105 to retrieve data from the Disc 130.

In one embodiment, the processor module 705 receives a detection signal from optical detectors 238, 240 such as the second and third optical detectors 238, 240 of FIG. 2. The processor 705 may decode Detections of a reflected beam 258 such as the reflected beam 258 of FIG. 2 from the optical detectors 238, 240. The processor module 705 may further adjust the decoding of Detections to adjust for differences in the index of refraction for a spacer layer 210 in contact with and in the path of the radiation beam 252 to the data surface 210 from which the reflected beam 258 is reflected. In one embodiment, the processor module 705 communicates decoded data through the communication module 720.

The schematic flow chart diagrams that follows are generally set forth as a logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
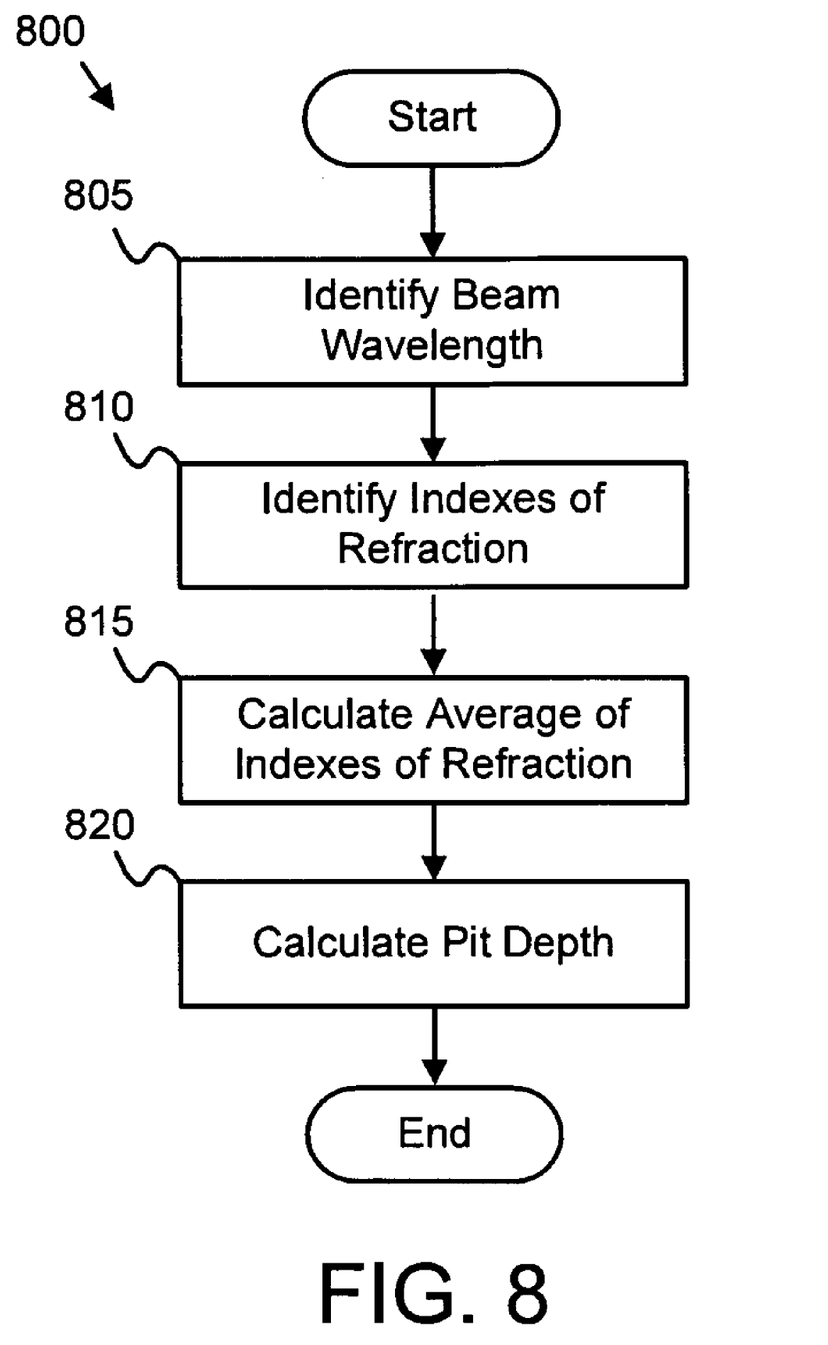
FIG. 8 is a schematic flow chart diagram illustrating one embodiment of a common pit depth calculation method of the present invention.

FIG. 8 is a schematic flow chart diagram illustrating one embodiment of a common depression depth calculation method 800 of the present invention. The method 800 substantially includes the steps necessary to carry out the functions presented above with respect to the operation of the described and system 100 and Disc 130 of FIGS. 1-7. In one embodiment, the elements referenced by the method 800 are the elements of FIGS. 1-7.

The method 800 begins and an operator or automated processes such as a spreadsheet, computer program, or the like (hereinafter referred to as the operator) identifies 805 a wavelength for a radiation beam 252 such as from a laser diode 220. The operator also identifies 810 a plurality of indexes of refraction for each of a plurality of spacer layers 210 comprising the Disc 130. In one embodiment, the operator identifies 810 the indexes of refraction for the first and second spacer layers 210a, 210b. In one embodiment, a first spacer layer 210a is configured as a substrate. Each spacer layer 210 is configured to transmit the radiation beam 252.

The operator further calculates 815 an average index of refraction for the plurality of spacer layers 210. In one embodiment, the average index of refraction is an arithmetic mean of the indexes of refraction. Equation 4 illustrates the calculation of the arithmetic mean of the indexes of refraction na where $n_i$ is the index of refraction for the ith spacer layer 210 and j is the number of spacer layers 210 in the Disc 130.

$$na = \frac{\sum_{i=1}^{j} n_i}{j} \quad \text{Equation 4}$$

In an alternate embodiment, the average is a harmonic mean of the indexes of refraction. Equation 5 illustrates the calculation of the harmonic mean of the indexes of refraction na where $n_i$ is the index of refraction for the ith spacer layer 210 and j is the number of spacer layers 210 in the Disc 130.

$$na = \frac{1}{\left(\frac{\sum_{i=1}^{j} \frac{1}{n_i}}{j}\right)} \quad \text{Equation 5}$$

The average may also be a geometric mean of the indexes of refraction. Equation 6 illustrates the calculation of the geometric mean of the indexes of refraction na where $n_i$ is the index of refraction for the ith spacer layer 210 and j is the number of spacer layers 210 in the Disc 130.

$$na = \left(\prod_{i=1}^{j} n_i\right)^{\frac{1}{j}}. \quad \text{Equation 6}$$

The operator calculates 820 a depression depth for encoding data on each of a plurality of data surfaces 205. The depression depth d is substantially equal to the radiation beam wavelength divided by four times the average index of refraction for each spacer layer 210 as shown in Equation 3, where $\lambda$ is the wavelength of the radiation beam 252 and na is the average index of refraction of the spacer layers 210. Upon calculation of the depression depth, the method 800 terminates. The method 800 calculates a common depression depth for reducing Disc 130 manufacturing costs.

Figure 9:
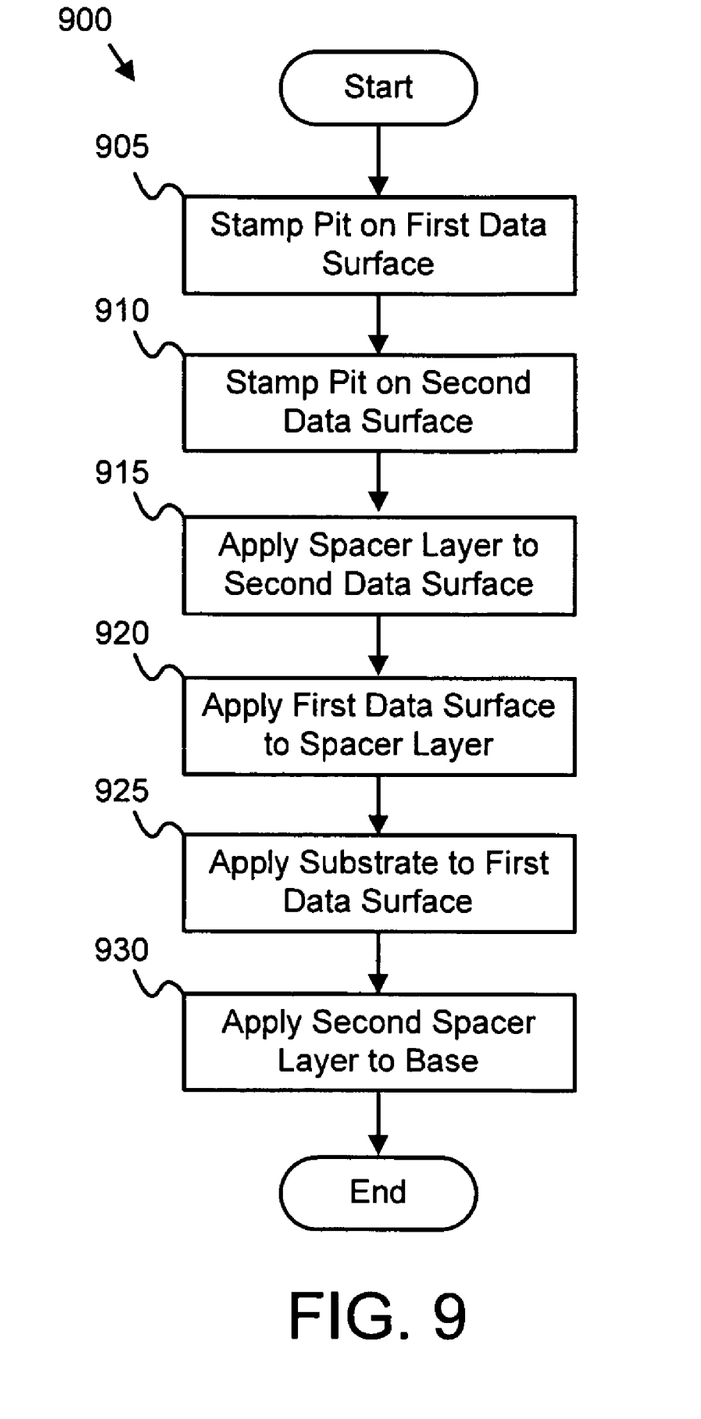
FIG. 9 is a schematic flow chart diagram illustrating one embodiment of an optical data storage medium manufacturing method of the present invention.

FIG. 9 is a schematic flow chart diagram illustrating one embodiment of a Disc manufacturing method 900 of the present invention. The method 900 substantially includes the steps necessary to carry out the functions presented above with respect to the fabrication of the described Disc 130 of FIGS. 2-6. In one embodiment, the elements referenced by the method 900 are the elements of FIGS. 2-6.

The method 900 begins and a manufacturing system stamps 905 a pit 305 with a specified pit depth on a land portion 405 of a first data surface 205a. In one embodiment, the land portion 405 is disposed between grooves formed on the data surface 205. In an alternate embodiment, the land portion 405 is disposed on an inverted groove formed on the data surface 205.

In addition, the manufacturing system stamps 910 a pit 305 with the specified pit depth on a land portion 405 of a second data surface 205b. The specified pit depth is substantially equal to the wavelength of a specified radiation beam 252 divided by four times the average of a first index of refraction for a first spacer layer or substrate 210a and a second index of refraction for a second spacer layer 210b as shown in Equation 3.

In one embodiment, the average index of refraction of the first and second indexes of refraction is an arithmetic mean. Equation 7 illustrates the calculation of the arithmetic mean of the indexes of refraction na where $n_1$ is the first index of refraction and $n_2$ is the second index of refraction.

$$na = \frac{n_1 + n_2}{2} \quad \text{Equation 7}$$

In an alternate embodiment, the average is a harmonic mean of the indexes of refraction. Equation 5 illustrates the calculation of the harmonic mean of the indexes of refraction na where $n_1$ is the first index of refraction and $n_2$ is the second index of refraction.

$$na = \frac{2n_1 n_2}{(n_1 + n_2)} \quad \text{Equation 8}$$

The average may also be a geometric mean of the indexes of refraction. Equation 9 illustrates the calculation of the geometric mean of the indexes of refraction na where $n_1$ is the first index of refraction and $n_2$ is the second index of refraction.

$$na = \sqrt{n_1 n_2} \quad \text{Equation 9}$$

The manufacturing system further applies 915 the second spacer layer 210b to the second data surface 205b. The second spacer layer 210b maintains a spacing distance between a first data surface 205a and the second data surface 205b and is configured to transmit the radiation beam 252.

The manufacturing system applies 920 the first data surface 205a to the second spacer layer 210b. In addition, the manufacturing system applies 925 the substrate 210a to the first data surface 205a. In one embodiment, the manufacturing system applies 930 the second data surface 205b, and the connected substrate 210a and first data surface 205a, to a base, and the method 900 terminates. Although the method 900 is depicted manufacturing a Disc 130 with two data surfaces 205, the method 900 may be applied to Discs 130 with any number of data surfaces 205.

Figure 10:
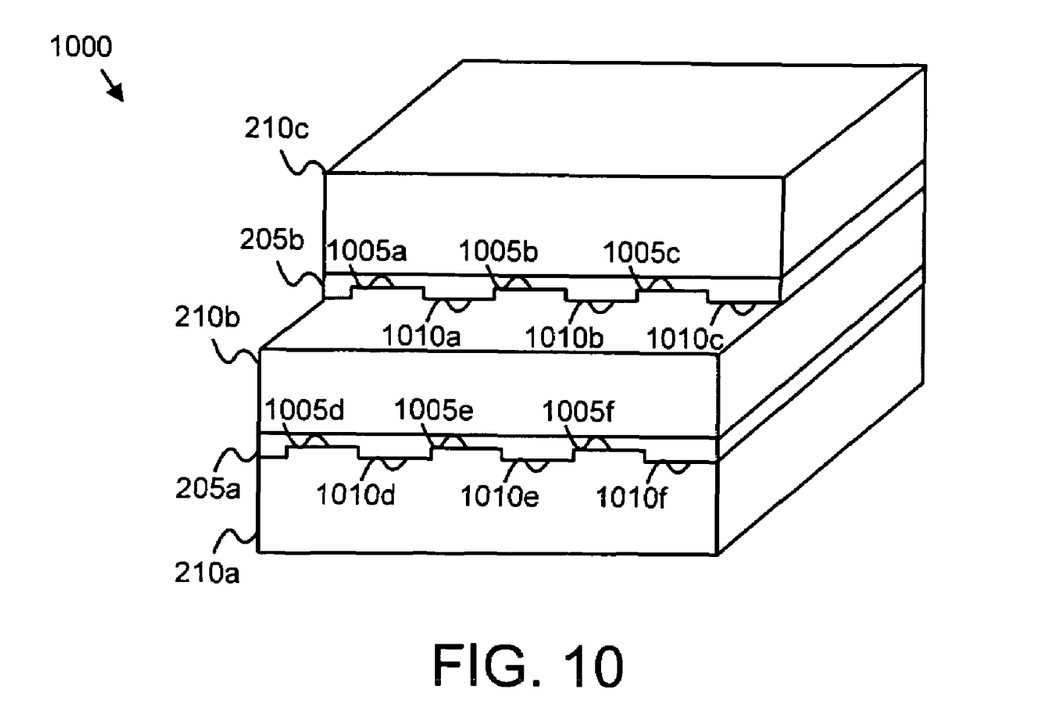
FIG. 10 is a cross-section drawing of a portion of a recordable optical data storage medium of the present invention.

FIG. 10 is a cross-section drawing of a portion of a recordable optical data storage medium 1000 of the present invention. The medium 1000 may be the Disc 130 of FIGS. 1 and 2. The medium 1000 includes a plurality of data surfaces 205 and a plurality of spacer layers 210. Although for simplicity the medium 1000 is depicted with two data surfaces 205 and three spacer layers 210, any number of data surfaces 205 and spacer layers 210 may be employed.

Each data surface 205 comprises a plurality of grooves 1005 and lands 1010. Data may be recorded on both the grooves 1005 and the lands 1010. The lands 1010 and grooves 1005 are disposed radially from the center of a Disc 130. The data is recovered from the medium 1000 using a radiation beam 252 as described in FIGS. 1 and 2.

The depression depth d of the each groove 1005 as measured from the plane of the adjacent lands 1010 to the base of the grooves 1005 is calculated by Equation 3, where $\lambda$ is the wavelength of the radiation beam 252 and na is the average index of refraction of the spacer layers 210. When the radiation beam 252 is focused on a land 1010, any of the radiation beam 252 that strays into an adjacent groove 1005 will be canceled upon reflection from the groove 1005, improving the signal-to-noise ratio of a reflected beam 258 such as the reflected beam 258 of FIG. 2 that is reflected from the land 1010. Similarly, when the radiation beam 252 is focused into a groove 1005, any stray light that reflects off of adjacent lands 1010 will be canceled upon reflection from the lands 1010.

The present invention calculates a common depression depth for depressions such as pits and grooves disposed on a plurality of data surfaces 205 on a Disc 130. In addition, the present invention may reduce the manufacturing cost of a prerecorded Disc 130 by allowing the pits for each data surface 210 to be stamped to a common pit depth. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical data storage medium, the medium comprising:
   a substrate configured to transmit a radiation beam with a first index of refraction and wherein the radiation beam has a specified wavelength;
   a first data surface configured to store digital data, the first data surface transmitting the radiation beam and having a land portion with pits of a specified pit depth disposed on the land portion, wherein the pit depth is the perpendicular distance between the plane of the land portion and the base of the pit;
   a second data surface configured to store digital data, the second data surface having a land portion with pits of the pit depth disposed on the land portion; and
   a spacer layer configured to maintain a spacing distance between the first and second data surfaces and to transmit the radiation beam with a second index of refraction such that the radiation beam passes through the substrate and focuses on either the first or second data surfaces, wherein the pit depth is substantially equal to the radiation beam wavelength divided by four times the average of the first and second indexes of refraction.

2. The optical data storage medium of claim 1, wherein the average of the first and second indexes of refraction is an arithmetic mean.

3. The optical data storage medium of claim 1, wherein the average of the first and second indexes of refraction is a harmonic mean.

4. The optical data storage medium of claim 1, wherein the average of the first and second indexes of refraction is a geometric mean.

5. The optical data storage medium of claim 1, wherein the radiation beam is generated by a laser diode.

6. The optical data storage medium of claim 1, wherein the radiation beam wavelength is in the range of three hundred and eighty-five nanometers (385 nm) to four hundred and twenty-five nanometers (425 nm).

7. The optical data storage medium of claim 1, wherein the radiation beam wavelength is in the range of six hundred and thirty nanometers (630 nm) to six hundred and seventy nanometers (670 nm).

8. The optical data storage medium of claim 1, further comprising a base layer.

9. The optical data storage medium of claim 1, wherein the first and second data surfaces each comprise a plurality of grooves, wherein the land portion is disposed between two of the plurality of grooves.

10. The optical data storage medium of claim 1, wherein the first and second data surfaces further comprise an inverted groove and the land portion is disposed on the groove.

11. The optical data storage medium of claim 10, further comprising a means for receiving the land portion.

12. A system to optically store data, the system comprising:
an optical data storage medium comprising
 a substrate configured to transmit a radiation beam with a first index of refraction and wherein the radiation beam has a specified wavelength;
 a first data surface configured to store digital data, the first data surface transmitting the radiation beam and having a land portion with pits of a specified pit depth disposed on the land portion, wherein the pit depth is the perpendicular distance between the plane of the land portion and the base of the pit;
 a second data surface configured to store digital data, the second data surface having a land portion with pits of the pit depth disposed on the land portion;
 a spacer layer configured to maintain a spacing distance between the first and second data surfaces and to transmit the radiation beam with a second index of refraction such that the radiation beam passes through the substrate and focuses on either the first or second data surfaces, wherein the pit depth is substantially equal to the radiation beam wavelength divided by four times the average of the first and second indexes of refraction;
 a spindle motor configured to rotate the optical data storage medium;
 an optical head configured to direct the radiation beam to the first or second data surface and direct a reflected beam from the data surface;
 an arm configured to position the optical head;
 an optical module configured generate the radiation beam and to detect the pits from the reflected beam; and
 a control module configured to control the optical module and the spindle motor, and to convert the detected pits to digital data.

13. The system of claim 12, wherein the average of the first and second indexes of refraction is an arithmetic mean.

14. The system of claim 12, wherein the average of the first and second indexes of refraction is a harmonic mean.

15. The system of claim 12, wherein the average of the first and second indexes of refraction is a geometric mean.

16. The system of claim 12, wherein the radiation beam wavelength is in the range of three hundred and eighty-five nanometers (385 nm) to four hundred and twenty-five nanometers (425 nm).

17. A method for calculating a common depression depth for an optical data storage medium, the method comprising:
 receiving by way of a processor an identified wavelength for a radiation beam;
 receiving by way of a processor an identified first index of refraction for a plurality of spacer layers configured to transmit the radiation beam;
 calculating by way of a processor an average index of refraction;
 calculating by way of a processor a depression depth for a plurality of depressions disposed on data surfaces as substantially equal to the radiation beam wavelength divided by four times the average index of refraction; and
 presenting the calculated depression depths for the plurality of depressions to a user.

18. The method of claim 17, further comprising calculating the average index of refraction as a mean selected from an arithmetic mean, a harmonic mean, and a geometric mean.

19. The method of claim 17, wherein the depression is configured as a pit.

20. The method of claim 17, wherein the depression is configured as a groove.

21. The method of claim 17, wherein the radiation beam wavelength is in the range of three hundred and eighty-five nanometers (385 nm) to four hundred and twenty-five nanometers (425 nm).

22. The method of claim 17, wherein the radiation beam wavelength is in the range of six hundred and thirty nanometers (630 nm) to six hundred and seventy nanometers (670 nm).

23. A method for manufacturing an optical data storage medium, the method comprising:
 stamping a pit on a land portion of a first data surface to a specified pit depth, wherein the pit depth is the perpendicular distance between the plane of the land portion and the base of the pit, the first data surface transmitting a radiation beam with a specified wavelength;
 stamping a pit on a land portion of a second data surface to the pit depth;
 applying a spacer layer to the second data surface, the spacer layer configured to maintain a spacing distance between the first and second data surfaces to the second data surface, wherein the spacer layer transmits the radiation beam with a second index of refraction;
 applying the first data surface to the spacer layer; and
 applying a substrate to the first data surface, wherein the substrate transmits the radiation beam with a first index of refraction such that the radiation beam passes through the substrate and focuses on either the first or second data surfaces, and wherein the pit depth is substantially equal to the radiation beam wavelength divided by four times the average of the first and second indexes of refraction.

24. The method of claim 23, further comprising applying the second data surface to a base layer.

25. The method of claim 23, wherein the average of the first and second indexes of refraction is an arithmetic mean.

26. The method of claim 23, wherein the average of the first and second indexes of refraction is a harmonic mean.

27. The method of claim 23, wherein the average of the first and second indexes of refraction is a geometric mean.

28. The method of claim 23, further comprising forming a plurality of grooves on the first and second data surfaces.

29. The method of claim 28, wherein the land portion is disposed between two of the plurality of grooves.

30. A computer readable storage medium tangibly embodying a program of machine-readable instructions executable by a digital processing apparatus to perform operations to calculate a common pit depth, the operations comprising:

identifying a wavelength for a radiation beam;
   identifying the first indexes of refraction for a plurality of spacer layers configured to transmit the radiation beam;
   calculating an average index of refraction; and
   calculating a pit depth for a plurality of pits disposed on data surfaces as substantially equal to the radiation beam wavelength divided by four times the average index of refraction.

* * * * *